United States Patent [19]
Gianessi et al.

[11] 3,907,333
[45] Sept. 23, 1975

[54] PINNED ON MODULAR ATTACHMENTS WITH INTERCHANGEABLE COMPONENTS

[75] Inventors: Albert Gianessi, East Peoria; Leon Arnold Wirt, Joliet, both of Ill.

[73] Assignee: Caterpillar Tractor Company, Peoria, Ill.

[22] Filed: Oct. 7, 1974

[21] Appl. No.: 512,194

[52] U.S. Cl.......... 280/415 R; 280/415 A; 280/481; 172/699; 172/250
[51] Int. Cl.²..................... B62D 21/12; B60D 1/00
[58] Field of Search......... 280/415 R, 481; 172/248, 172/253, 250, 245, 801, 808

[56] References Cited
UNITED STATES PATENTS

| | | | |
|---|---|---|---|
| 2,868,579 | 1/1959 | Panasewicz | 280/481 |
| 2,901,846 | 9/1959 | Armington | 172/801 |
| 3,809,167 | 5/1974 | Glider | 172/808 |
| 3,844,369 | 10/1974 | Schroeder | 172/801 |

Primary Examiner—Leo Friaglia
Attorney, Agent, or Firm—Phillips, Moore, Weissenberger Lempio & Strabala

[57] ABSTRACT

Mounting means for mounting attachments upon an earthmoving vehicle. A pair of mounting brackets each having a pair of parallel disposed triangular-shaped bracket plates are straddle mounted upon the vehicle main frame and a cross-beam member laterally extends between the mounting brackets. The brackets are removably secured to the main frame and the cross-beam member is removably secured to the brackets and to the main frame for rapid access to rear-mounted modular components and for rapid mounting and demounting of the brackets and cross-beam member. The cross-beam member may include a vehicle attachment or function primarily as a structural support for the mounting means. Owing to the disposition of the mounting means upon the main frame, attachment loads are transmitted directly and evenly to the frame, without side loading. Additionally, the mounting means functions to guard rear-mounted vehicle components such as the vehicle transmission. The mounting means accept a plurality of different interchangeable attachments for accomplishing different functions.

8 Claims, 4 Drawing Figures

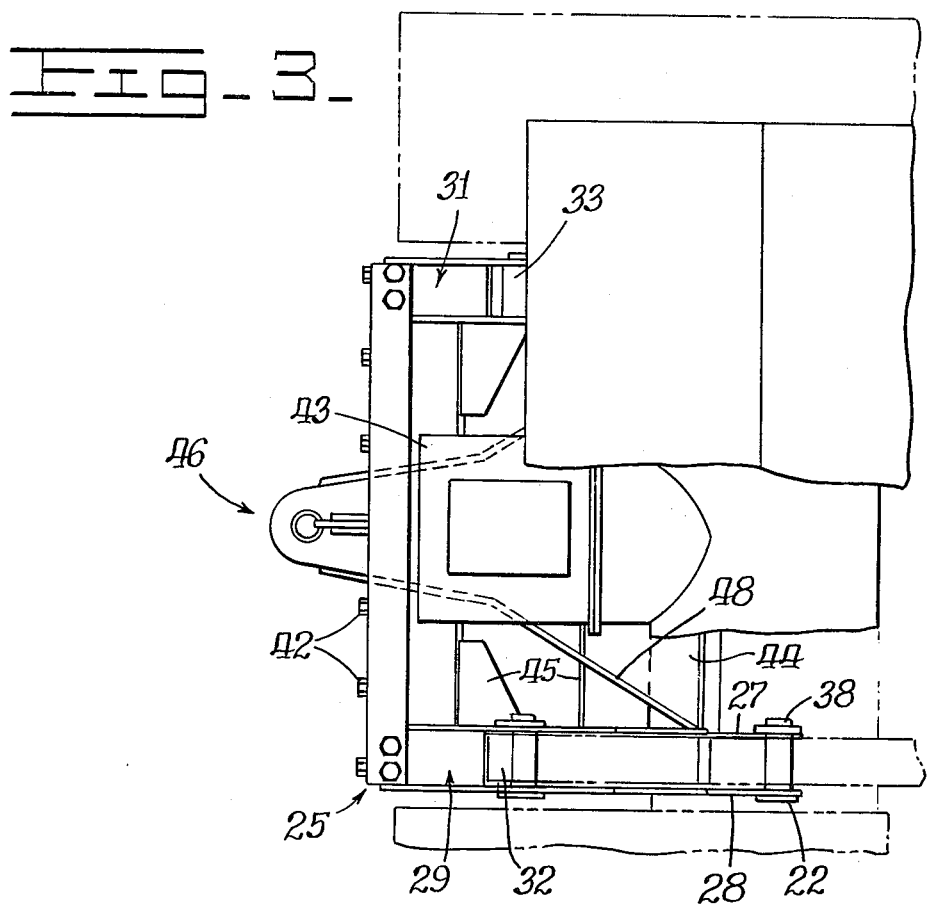
Fig-3-
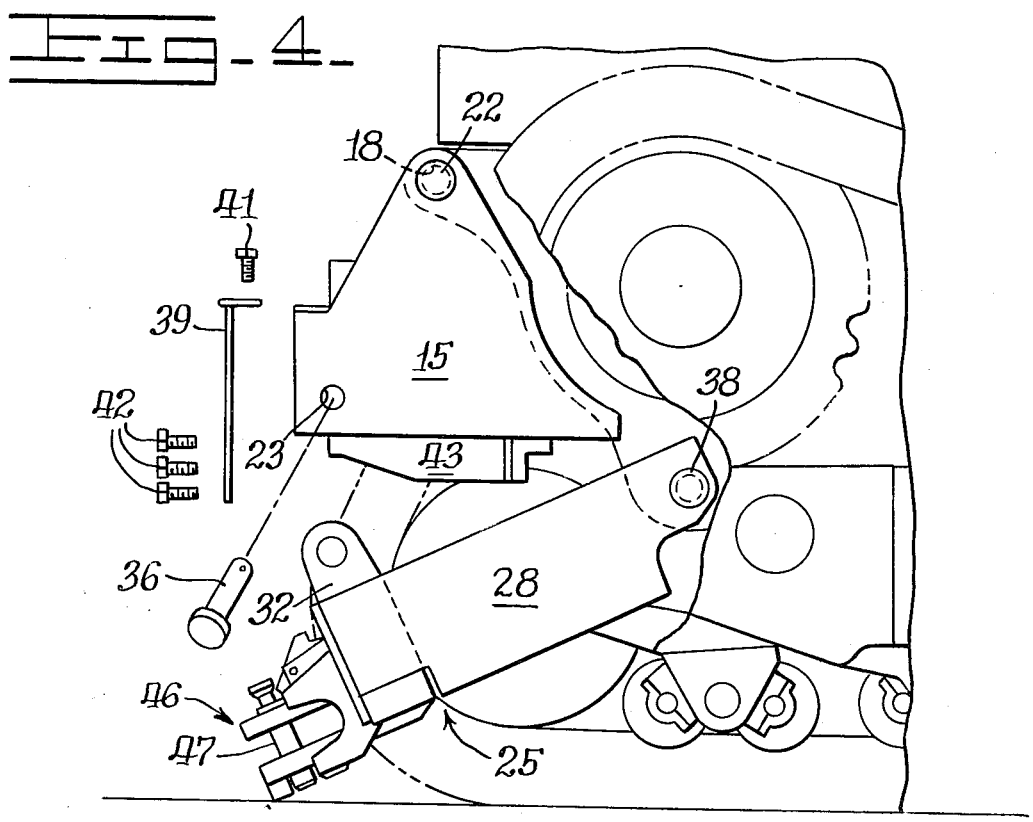
Fig-4-

PINNED ON MODULAR ATTACHMENTS WITH INTERCHANGEABLE COMPONENTS

CROSS REFERENCE TO RELATED APPLICATIONS

This invention relates to the inventions disclosed in U.S. patent applications, Ser. No. 512,197, filed on Oct. 7, 1974 by Glenn H. Stanfield, entitled IMPLEMENT MOUNTING ARRANGEMENT FOR EARTHMOVING EQUIPMENT, and Ser. No. 512,196, filed on Oct. 7, 1974 by Frederick kokaly and Leon Wirt, entitled PUSHBLOCK AND DRAWBAR ASSEMBLY FOR TRACTORS, both applications being of common assignment herewith.

BACKGROUND OF THE INVENTION

This invention relates to mounting means for mounting modular attachments to an earthmoving vehicle. More particularly, this invention relates to mounting means which function to permit the ready interchangeability of various modular vehicle attachments. The instant mounting means in combination with an attachment mounted thereupon further function as a guard for the vehicle transmission or other component.

The massive size and weight of modern earthworking vehicles present considerable design problems in assuring optimum location of the various component parts and assemblies so that excessive stress producing forces are not transmitted between, for example, a tractor and its associated implement. Such high stresses in tractor components tend to cause premature failure of these components and of the associated mounting brackets for the implement.

The usual approach has been to increase the size and weight of vulnerable components for added strength. However, such a practice adds significantly to the overall weight of the vehicle, making matters such as transporting the vehicle more difficult in view of legal load limitations.

Further, complementing attachments or implements such as heavy-duty draw-bars, push blocks, hitches, and deep penetrating high load ripper assemblies must be securely but conveniently mounted upon the vehicle by mounting means which permit rapid and efficient substitution of alternate implements.

Additionally, to facilitate manufacture and servicing of earthmoving vehicles, modular component parts, such as the rear-mounted transmission for the crawler tractor described in U.S. Pat. No. 2,971,398, are now employed. Such modular components, however, present additional problems because means must be provided for protecting such components from impact damage during use. Since such vehicles are commonly operated in severe operating environments, protection means have to be sturdy enough to prevent costly damage in the event the vehicle and transmission inadvertently encounter a tree stump, rock or other obstacle. Preferably, such protection means are also of minimum size and weight to avoid undesirable increases in total vehicle weight. Such means should also be sufficiently flexible to provide component accessibility for facilitating periodic vehicle inspections and servicing.

Exemplary of prior art attempts to provide high strength light weight means for such applications are U.S. Pat. Nos. 3,774,708 and 2,971,398, of common assignment herewith.

SUMMARY AND OBJECTS OF THE INVENTION

The instant invention provides mounting means and a method for mounting and demounting attachments on earthmover vehicles so as to provide ready interchangeability of such attachments. The mounting means also function to transmit attachment loads directly and evenly to the vehicle main frame so that excessive forces are not directly transmitted to the vehicle mounting components and so that customary stresses on the mounting components caused by side loading, cantilevered mountings, and similar phenomena are alleviated.

The mounting means, together with its associated attachments or implements also function to guard vehicle components, such as a rear-mounted transmission, and to provide ready access to such components.

The mounting means of the present invention include a pair of laterally spaced, parallel mounting brackets, each of which comprise a pair of triangularly-shaped, laterally-spaced, parallel bracket plates which include first and second pinreceiving means comprising aligned apertures in the apexes and rear sides thereof for receiving pins which removably secure the brackets to the main frame of the vehicle and which removably secure the cross-beam member to the brackets. The cross-beam member structurally integrates the brackets to provide a rigid, self-contained mounting structure capable of absorbing and supporting side-loading. The brackets are straddle-mounted upon the vehicle frame and cross-beam member over ears provided thereupon for maximum strength of the mounting structure and for even transfer of loads to the vehicle frame.

The cross-beam member of the invention includes a pair of longitudinally-extending members each of which are removably pinned to the main vehicle frame at one end thereof and secured at the opposite end thereof to a laterally extending member. The cross-beam member is pinned to the mounting brackets through ears formed upon each of the longitudinally-extending members, and is thus readily mountable and demountable by insertion or removal of the appropriate pins. Additionally, free access to rear-mounted vehicle components may be readily had by unpinning the cross-beam member from the brackets and pivoting this member to the ground.

In one embodiment of the invention, the cross-beam member is adapted to include a vehicle attachment such as a draw bar, push block, or the like, while in an alternate embodiment of the invention the cross-beam member functions primarily to structurally integrate the mounting brackets and to thus provide a rigid mounting structure for attachments such as a ripper assembly. The mounting means of the present invention also include mounting brackets variously adapted to accommodate specific attachments. The brackets and the modifications thereof, however, all include at least first pin receiving means corresponding to the ears disposed on the vehicle main frame for readily interchangeability of the mounting brackets as necessitated by specific attachment requirements.

It is an object of the invention to provide mounting means for mounting attachments on an earthmoving vehicle which permit ready interchangeability of rear-mounted vehicle attachments and which afford protection for vehicle components without appreciably increasing the total weight of the vehicle.

It is another object of this invention to provide mounting means for mounting attachments on an earthworking vehicle which permit ready access to rear-mounted vehicle components.

It is a further object of this invention to provide mounting means for mounting attachments on an earthworking vehicle which directly and evenly transfer attachment loads to the vehicle frame and which alleviate customary stresses between the attachment and vehicle components.

It is an additional object of this invention to provide mounting means for an earthworking vehicle which comprises a rigid structure which is capable of absorbing sideloading.

Another object of this invention is to provide mounting means for mounting attachments on an earthworking vehicle which comprise strong rigid structure and multi-component characteristics which facilitate handling.

Still another object of this invention is to provide mounting means for mounting a high attachment to an earthworking vehicle which permit ready interchangeability of the hitch attachment for other rear-mounted attachments such as rippers or push blocks.

Other objects and advantages of the invention will be apparent from the following description and drawings.

BRIEF DESCRIPTION OF THE DRAWINGS

FIG. 3 is a plan view of the mounting means of FIG. 1; and

FIG. 4 is a partially exploded view of the mounting means of FIG. 1

DETAILED DESCRIPTION

Figure 2:
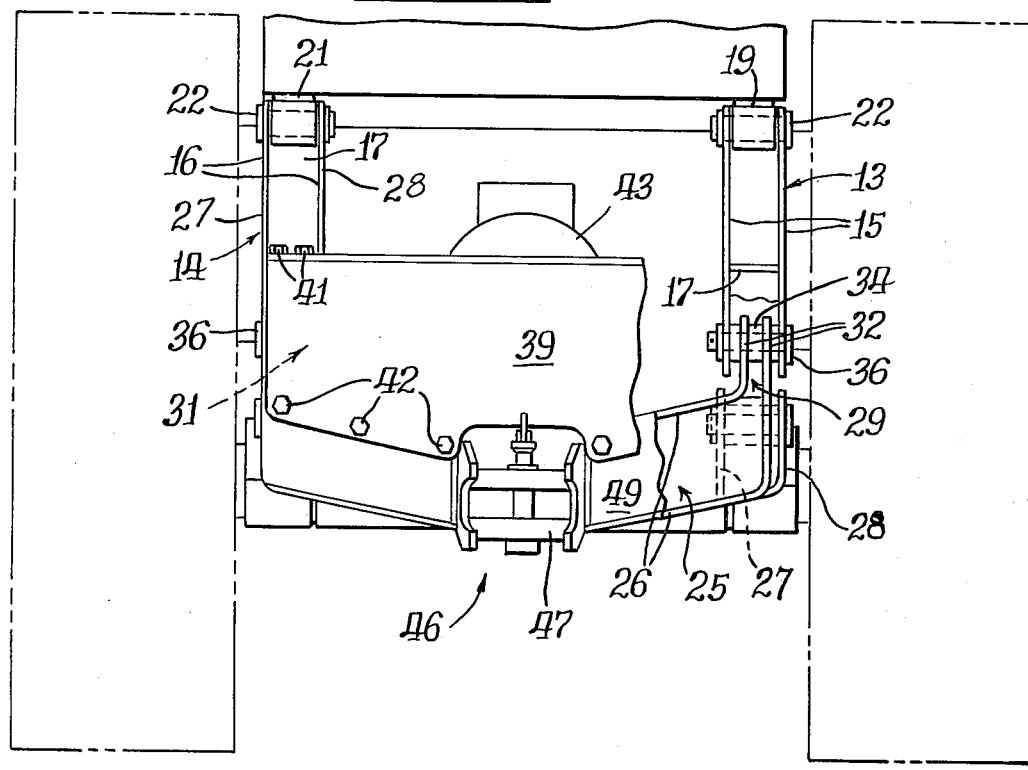
FIG. 2 is a rear view of the vehicle and mounting means of FIG. 1.

The mounting means of this invention, generally indicated at 10, are shown in association with an earthmover vehicle 11 of the type described in U.S. Pat. No. 3,774,708 to Purcell, cited hereinabove. The vehicle has a main frame 12 and other undercarriage conventional components. The mounting means 10 include right and left (as shown in FIG. 2) vertically disposed, laterally spaced parallel mounting brackets 13 and 14 respectively. Each of the brackets 13 and 14 include a pair of laterally-spaced triangularly-shaped bracket plates 15 and 16, respectively, fixed in parallel relationship by a plurality of internal reinforcing plates or spacers 17.

The brackets 13 and 14 further include pin receiving means comprising corresponding aligned apertures 18 in the apexes of the bracket plates 15 and 16 disposed for alignment with right and left frame ears 19 and 21, respectively, projecting rearwardly on the right and left sides, respectively, of the main frame 12. The apertures 18 are adapted to receive mating pins 22 for removably securing the brackets 13 and 14 to the vehicle in a way that the bracket plates 15 straddle the right frame ear 19 and the bracket plates 16 straddle the left frame ear 21.

Figure 1:
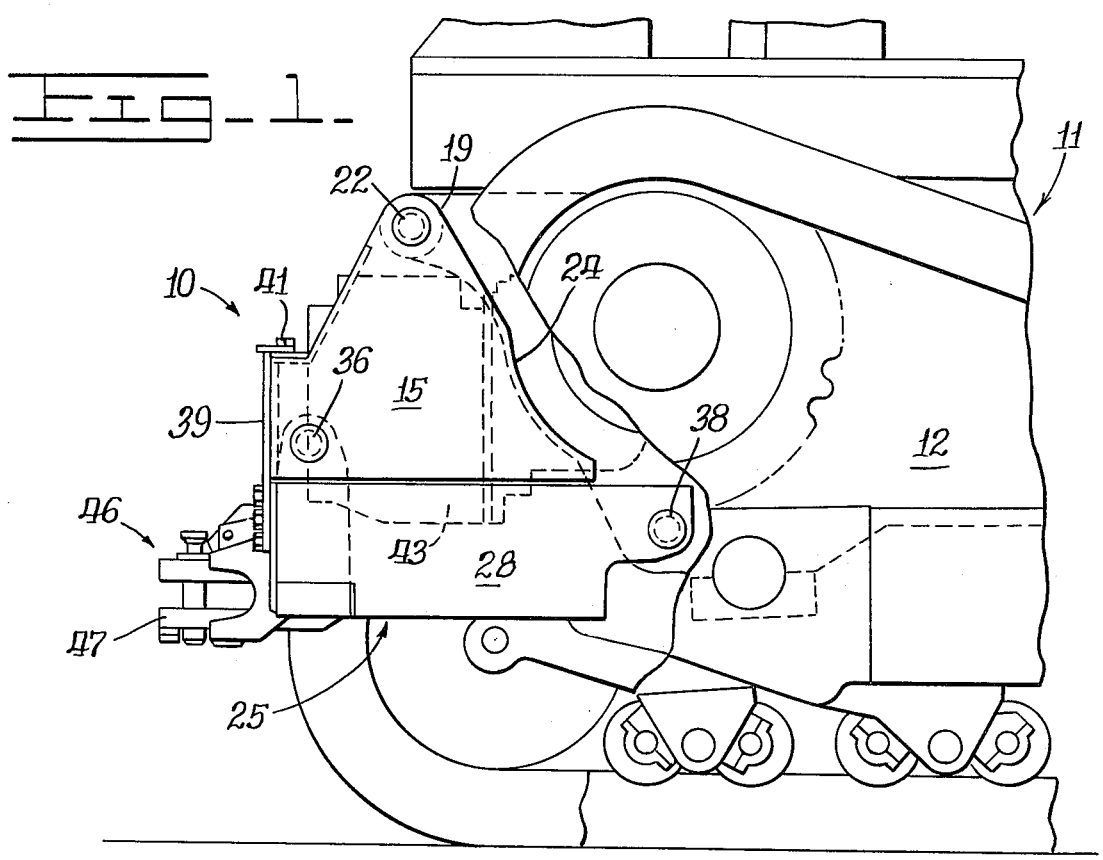
FIG. 1 is an elevation of the mounting means of this invention including a draw bar attachment, shown in association with an earthmover vehicle.

The bracket plates 15 and 16 each further include other pin receiving means comprising apertures 23 on rearward portions thereof for a purpose to be hereinafter described. As best shown in FIG. 1, the forward edges of each of the bracket plates 15 and 16 are slightly relieved, as shown at 24 for overlapping and mating with rearwardly protruding corresponding edges of the frame 12 to thereby maintain the vertical alignment of the brackets 13 and 14.

The mounting means 10 further include a cross-beam member 25 which comprises a pair of vertically-spaced lateral beam plates 26 extending between the brackets 13 and 14, and two pairs of laterally-spaced longitudinally extending beam plates 27 and 28 extending parallel to the brackets 13 and 14 respectively and cooperating with the lateral beam plates 26. The right and left end portions of the lateral beam plates 26, generally indicated at 29 and 31 respectively, are vertically disposed with respect to the central portions thereof to form beam ears 32 for disposition between the bracket plates 15 and 16. The beam ears 32 are provided with a tubular bushing 34 alignable with the apertures 23 in the bracket plates 15 and 16. The bushings 34 and apertures 23 are adapted to receive mating pin members 36 which removably secure the cross-beam member 25 to the brackets 13 and 14 in such a way that the bracket plates 15 and 16 straddle the beam ears 32. The forward portions of the longitudinal beam plates 27 and 28 are pivotally secured directly to the extreme rearward right and left side portions of the frame 12 by means of pins 38.

A rear cross cover plate 39 is secured to the brackets 13 and 14 by bolts 41 and to the cross-beam member 25 by bolts 42. The cover plate 39 joins the brackets and cross-beam member into an integral unit with great structural strength and also affords protection for vehicle components such as a rear mounted transmission 43 and its associated externally mounted hydraulic-transmission controls (not shown). The transmission 43 is further protected by the cross-beam member 25 which reinforces a relatively heavy-gauge bottom panel members 44 with a plurality of internal plates and gussets 45, as best shown in FIG. 3.

In the illustrated embodiment, the cross-beam member 25 includes an attachment 46 which comprises a drawbar with an integral clevis hitch 47. The hitch 47 is structurally reinforced by gussets 45 and by a pair of obliquely disposed structural wall members 48 which converge rearwardly from the inner surfaces of the longitudinal beam plates 27 and 28 to the hitch 47 and are welded thereto. The lateral beam plates 26 are vertically spaced and angularly formed so that their central portion, and a rear closure plate 49 therefor, are at a sufficiently low level to afford substantial vertical alignment of the hitch 47 and its associated implements, and further, to afford sufficient clearance below the transmission 43.

As best shown in FIG. 4, the brackets 13 and 14 are initially individually attached to the frame 12 by straddle mounting the bracket plates 15 and 16 over the frame ears 19 and 21 and inserting the pins 22 through the apertures 18 of the bracket plates and through the frame ears. The forward portions of the longitudinal beam plates 27 and 28 are then secured to the right and leftsides, respectively, of the frame 12 by the pins 38. The cross-beam 25 is then elevated so that the beam ears 32 and 33 are respectively straddled by the bracket plates 15 and 16 and the pins 36 are inserted through the bushings 34 and the apertures 23 in the brackets 13 and 14 to couple the cross-beam member 25 to the brackets.

For normal access to and removal and service of the transmission, detachment of the cross plate 39 will generally be sufficient. However, if increased access is desired, the pins 36 are removed to allow the cross-beam member 25 to pivotally descend to the ground.

In an alternate embodiment of this invention, the attachment 46 comprises a push-block and draw bar tie combination, such as that more fully described in the abovementioned copending application Ser. No. 512,196, by Kokaly and Wirt. In another embodiment of this invention, the mounting means 10 could comprise modified mounting brackets 13 and 14 and a cross-beam member 25 designed for mounting and supporting a ripper attachment and its associated controls. Such an embodiment is described in our abovementioned copending application Ser. No. 512,197, by Stanfield.

It is apparent that the invention provides versatile mounting means for mounting and rapidly interchanging attachments for earthworking vehicles. By providing means for directly and evenly transmitting attachment loads to the main frame of the vehicle, the invention additionally functions to extend the wear-life of vehicle components such as mounting brackets without increasing the size of such components and, consequently, total vehicle weight. Further, the invention facilitates access to, and increases protection of, rear mounting modular vehicle components such as vehicle transmissions. Additionally, the invention provides mounting means of a multicomponent character which reduces the individual handling weight of the parts thereof during assembly and disassembly. It also reduces the requirements for critical manufacturing tolerances at points of connection between the frame and mounting structure which tolerances would be required in a unitary mounting structure.

Although the invention has been described with respect to the preferred embodiments thereof, numerous modifications and alterations are possible within the purview of the invention, and no limitations are intended except by the scope of the appended claims.

We claim:

1. An earthmoving vehicle having a main frame for supporting any one of a plurality of different attachment implements thereupon and having mounting means for mounting said attachment implement upon said main frame, said main frame including at least a first pair of protruding ears integral with said main frame, first aperture means in said first pair of ears, said mounting means including first and second laterally spaced apart bracket means for supportive connection between said main frame and said attachment implement, said laterally spaced apart bracket means including second aperture means for mating alignment with said first aperture means in said first pair of ears, first pin means for being supportively received within said first and second aperture means for securing said first and second laterally spaced apart bracket means to said main frame, said main frame including third aperture means spaced apart from said first aperture means, said mounting means including cross beam means which include fourth aperture means for selective mating engagement with said third aperture means, second removable pin means for being selectively concurrently received within said third and fourth aperture means for further securing said mounting means to said main frame, said attachment implement including at least fifth aperture means for selective pinned mating aligned relation with at least one aperture means of said bracket means to selectively secure said attachment implement to said bracket means.

2. The invention of claim 1 wherein said one attachment implement is a selectively detachable drawbar means for said vehicle.

3. The invention of claim 2 wherein said first and second laterally spaced apart bracket means each include a pair of laterally spaced plate members, each said pair of plate members having portions disposed to straddle one of said pair of protruding ears on said main frame, said portions of said plate members including said second aperture means and receiving said first pin means.

4. The invention of claim 3 wherein said cross beam means include a laterally extending member having a portion connected rearwardly of said vehicle between said first and second bracket means, drawbar hitch means connected to said cross-beam means portion centrally thereof for towing.

5. The invention of claim 4 further including cover plate guard means connected to said cross-beam means and said first and second bracket means, said cross-beam means including a pair of longitudinally extending beams extending forwardly on said vehicle from said cross-beam means portion, said longitudinally extending beams being pivotably mounted upon said main frame about said second removable pin means.

6. The invention of claim 5 wherein said cross-beam means include a pair of upstanding projections containing sixth pin receiving aperture means at opposite lateral end portions of said cross-beam means portion, said plate members of said bracket means including seventh aperture means selectively alignable with said sixth aperture means, third pin means for selective operative disposition within said sixth and seventh apertures, said cross-beam means being rotatable about said second removable pin means when said third pin means is removed from said sixth and seventh apertures.

7. The invention of claim 6 wherein said laterally spaced plate members of said first and second laterally spaced bracket means are substantially triangularly shaped and have apexes proximate said first, second and third pin means.

8. The invention of claim 7 wherein said plate guard means is removably connected to said cross-beam means by means of a plurality of bolts.

* * * * *